US012686102B2

(12) United States Patent
Nelson et al.

(10) Patent No.: US 12,686,102 B2
(45) Date of Patent: Jul. 21, 2026

(54) TOOL WITH ETCHED TIP AND RELATED METHOD

(71) Applicant: Milwaukee Electric Tool Corporation, Brookfield, WI (US)

(72) Inventors: Collin J. Nelson, Milwaukee, WI (US); Andrew M. Tuchscherer, Wauwatosa, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 784 days.

(21) Appl. No.: 17/932,759

(22) Filed: Sep. 16, 2022

(65) Prior Publication Data

US 2023/0017379 A1     Jan. 19, 2023

Related U.S. Application Data

(63) Continuation of application No. PCT/US2022/075919, filed on Sep. 2, 2022.
(Continued)

(51) Int. Cl.
      *B25B 15/00*        (2006.01)
      *B23K 26/362*       (2014.01)
      *B25B 15/02*        (2006.01)
(52) U.S. Cl.
      CPC .......... *B25B 15/002* (2013.01); *B23K 26/362* (2013.01); *B25B 15/02* (2013.01); *B25B 15/005* (2013.01); *B25B 15/007* (2013.01)
(58) Field of Classification Search
      CPC .. B23K 26/362; B23K 2101/20; B25B 15/02; B25B 15/002; B25B 15/005; B25B 15/007
(Continued)

(56) References Cited

U.S. PATENT DOCUMENTS 1,741,349 A     12/1929   Sullivan
6,223,634 B1 *   5/2001   Hughes ................. B25B 15/005
                                              411/404
(Continued)

FOREIGN PATENT DOCUMENTS

CN     101332591     9/2010
JP     2000167776    6/2000

OTHER PUBLICATIONS

Wera 334 Screwdriver, https://products.wera.de/en/screwdrivers_ kraftform_plus_series_300_334.html, believed to be commercially available at least by Jun. 14, 2021, Retrieved on Sep. 15, 2022, 8 pages.
(Continued)

*Primary Examiner* — Hadi Shakeri
(74) *Attorney, Agent, or Firm* — Reinhart Boerner Van Deuren s.c.

(57)                ABSTRACT

A workpiece engaging surface that includes a pattern of laser-etched channels and related method of manufacturing is provided. The laser-etched pattern on the surface of the workpiece engaging surface is formed by multiple groupings of closely spaced channels that generate serrated teeth in the surface of the tip. Each grouping of channels is formed by passing a laser over a first location a first number of passes to form a first channel, passing a laser over a second location, spaced apart from the first location by a channel spacing distance, a second number of passes to form a second channel, and passing a laser over a third location, spaced apart from the second location by the channel spacing distance, a third number of passes to form a third channel. In some embodiments the first, second, and third number of passes are the same.

13 Claims, 11 Drawing Sheets

Related U.S. Application Data

(60)  Provisional application No. 63/240,567, filed on Sep. 3, 2021, provisional application No. 63/273,633, filed on Oct. 29, 2021.

(58)  Field of Classification Search
USPC .......................................... 81/436–439, 460
See application file for complete search history.

(56)                       References Cited

U.S. PATENT DOCUMENTS

| | | | |
|---|---|---|---|
| 6,655,241 B2 * | 12/2003 | Kozak ................... | B25B 15/007 |
| | | | 81/460 |
| 6,883,405 B2 | 4/2005 | Strauch | |
| 2003/0196527 A1 | 10/2003 | Strauch | |
| 2007/0051215 A1 | 3/2007 | Petillo | |

OTHER PUBLICATIONS

Wera 350 PH Screwdriver, https://products.wera.de/en/screwdrivers_kraftform_plus_series_300_350_ph.html, believed to be commercially available at least by Jun. 14, 2021, Retrieved on Sep. 15, 2022, 8 pages.

International Search Report and Written Opinion for International Application No. PCT/US2022/075919 dated Dec. 28, 2022, 10 pages.

* cited by examiner

112

114

212

214

312

314

TOOL WITH ETCHED TIP AND RELATED METHOD

CROSS-REFERENCE TO RELATED PATENT APPLICATIONS

This application is a continuation of International Application No. PCT/US2022/075919, filed Sep. 2, 2022, which claims the benefit of and priority to U.S. Provisional Application No. 63/273,633, filed Oct. 29, 2021, and U.S. Provisional Application No. 63/240,567, filed Sep. 3, 2021, the contents of which are incorporated herein by reference in their entireties.

BACKGROUND OF THE INVENTION

The present invention relates generally to the field of tools. The present invention relates specifically to tools with tips formed via laser etching.

SUMMARY OF THE INVENTION

One embodiment of the invention relates to an elongate tool having a workpiece engaging surface, such as a screwdriver tip, that includes a pattern of laser-etched channels. The laser-etched channels are configured in a manner that prevents the camming out of a screw head being engaged by the screwdriver tip when the screwdriver tip is used in operation with a screwdriver. The screwdriver tip includes a screwdriver tip surface. The screwdriver tip surface includes a first plurality of parallel channels that are spaced apart by a first spacing distance. The screwdriver tip surface also includes a second plurality of parallel channels that are spaced apart by the first spacing distance. The second plurality of parallel channels are spaced apart from the first plurality of parallel channels by a second spacing distance that is greater than the first spacing distance.

In specific embodiments, the first plurality of parallel channels includes three parallel channels. In other embodiments, the first plurality of parallel channels includes a first channel having a first channel depth and second channel having a second channel depth. The first and second channel depths are of sufficient size to form a tooth in the screwdriver tip surface between the first channel and the second channel.

In some embodiments, the screwdriver tip includes a screwdriver tip surface that further includes a third plurality of parallel channels spaced apart by a third spacing distance and a fourth plurality of parallel channels spaced apart by the third spacing distance. The fourth plurality of parallel channels is spaced apart from the third plurality of parallel channels by a fourth spacing distance that is greater than the third spacing distance. The third plurality of channels and the fourth plurality of channels are positioned at an angle sufficient to form a crosshatch with the first plurality of channels and the second plurality of channels.

Another embodiment of the present disclosure relates to a method of laser etching a workpiece engaging surface of tool, such as a screwdriver tip surface. The method includes forming a first plurality of parallel channels and a second plurality of parallel channels. The formation of the first plurality of parallel channels is accomplished by making a first number of laser passes over a first location to form a first channel and making a second number of laser passes over a second location to form a second channel. The second channel is formed parallel to the first channel and spaced apart from the first channel by a first spacing distance. The formation of the second plurality of parallel channels is accomplished by making a third number of laser passes over a third location to form a third channel and making a fourth number of laser passes over a fourth location to form a fourth channel. The fourth channel is formed parallel to the third channel and spaced apart from the third channel by the first spacing distance. The second plurality of parallel channels is spaced apart from the first plurality of parallel channels by a second spacing distance that is greater than the first spacing distance.

Another embodiment of the present disclosure relates to a tool that has a handle and a shaft extending from the handle. There is a laser-etched workpiece engaging surface on the shaft. The laser-etched workpiece engaging surface includes a first plurality of parallel channels spaced apart from one another by a first spacing distance, a second plurality of parallel channels spaced apart from one another by the first spacing distance and oriented parallel to the first plurality of parallel channels, and a first surface section located between the first plurality of parallel channels and the second plurality of parallel channels. The first surface section does not include a channel oriented parallel to the first plurality of parallel channels and the second plurality of parallel channels. Additionally, the first surface section defines a second spacing distance between the first plurality of parallel channels and the second plurality of parallel channels that is greater than the first spacing distance.

Another embodiment of the present disclosure relates to a tool that has a handle and a shaft extending from the handle. A laser-etched workpiece engaging surface is located on the shaft. The laser-etched workpiece engaging surface includes a first channel grouping comprising a plurality of first channels and a second channel grouping comprising a plurality of second channels. Each of the first channels are spaced apart from one another by a first spacing distance of between 1 thousandth of an inch and 4 thousandths of an inch. Additionally, each of the second channels are spaced apart from one another by the first spacing distance. Further, the second channel grouping is spaced apart from the first channel grouping by a second spacing distance that is greater than the first spacing distance. The first channel and the second channel each define a depth between approximately 0.00085 inches and approximately 0.0016 inches.

Another embodiment of the present disclosure relates to a method of laser etching a workpiece engaging surface of a tool. The method includes forming a first plurality of channels by making a first number of laser passes over a first location of the workpiece engaging surface to form a first channel, and making a second number of laser passes over a second location of the workpiece engaging surface to form a second channel parallel to the first channel and spaced apart from the first channel by a first spacing distance. The method further includes forming a second plurality of channels by making a third number of laser passes over a third location of the workpiece engaging surface to form a third channel, and making a fourth number of laser passes over a fourth location of the workpiece engaging surface to form a fourth channel parallel to the third channel and spaced apart from the third channel by the first spacing distance. Additionally, the step of forming the second plurality of channels includes spacing the second plurality of channels apart from the first plurality of channels by a second spacing distance that is greater than the first spacing distance.

In specific embodiments, the step of making the second number of laser passes includes making the same number of laser passes as are made in the step of making the first number of laser passes. Further, in some embodiment the step of making the third number of laser passes includes making the same number of laser passes as are made in the step of making the first number of laser passes. In certain embodiment, the first number of laser passes and the second number of laser passes are each of sufficient quantity to form the first channel and the second channel of sufficient respective depths to form a tooth in the screwdriver tip surface between the first channel and the second channel. In specific embodiments, the step of making the first number of laser passes includes making ten laser passes and the step of making the second number of laser passes includes making ten laser passes. Some embodiments may further include the step of forming a third plurality of parallel channels and a fourth plurality of parallel channels. The formation of the third plurality of parallel channels includes making a fifth number of laser passes over a fifth location to form of fifth channel and making a sixth number of laser passes over a sixth location to form a sixth channel parallel to the fifth channel and spaced apart from the fifth channel by the first spacing distance. The formation of the fourth plurality of parallel channels includes making a seventh number of laser passes over a seventh location to form of seventh channel and making an eighth number of laser passes over an eighth location to form an eighth channel parallel to the seventh channel and spaced apart from the seventh channel by the first spacing distance. The fourth plurality of channels is formed the second spacing distance apart from the third plurality of lines. The third and fourth plurality of lines are formed at an angle with respect to the first and second plurality of lines so as to form a crosshatch pattern.

Alternative exemplary embodiments relate to other features and combinations of features as may be generally recited.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Referring generally to the figures, various embodiments of a tool including a laser-etched workpiece engaging surface are shown. In the particular embodiments discussed herein, the specific tool shown is a screwdriver or screwdriver bit including a laser-etched surface on a tip configured to engage a screw head. Etching channels in laser-etched screwdriver tips are typically formed by a single pass of a high-power laser. However, Applicant has identified that this high-power method can often lead to melted zones that form convex geometry within a given etching channel, which Applicant has determined results in a less effective screwdriver tip.

Applicant has designed a tool workpiece engaging surface, such as a screwdriver tip, in which narrow, individual etching channels are formed by multiple passes of a low-power laser. The formation of narrower etching channels allows formation of groupings of closely spaced channels to be generated, such that serrated teeth are formed between the closely spaced channels in each grouping. The formation of narrower etching channels further allows a crosshatch etching pattern to be utilized. The serrated teeth and the crosshatch pattern each contribute to more efficient engagement of a screw head by the etched screwdriver tip, such that a higher amount of torque can be applied to the screwdriver tip by a screwdriver without the engaged screw head camming out.

Figure 1:
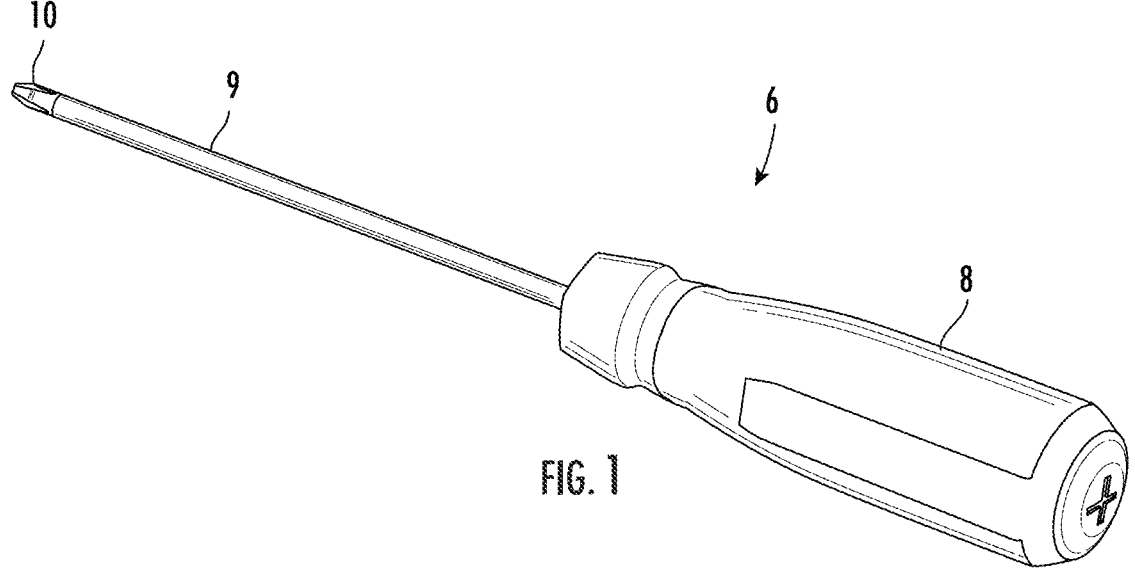
FIG. 1 is a perspective view of screwdriver including a laser-etch screwdriver tip, according to an exemplary embodiment.

FIG. 1 shows a driving tool, such as a Philips screwdriver 6. Screwdriver 6 includes a handle 8 and a shaft 9 extending from the handle 8. Shaft 9 terminates at its distal end at a workpiece engaging surface, shown as Philips screwdriver tip 10. In general, and as will be discussed in more detail below, tip 10 includes a surface structure with a channel/groove structure that Applicant believes improves engagement with a workpiece (e.g., a screw head), and in specific embodiments the surface structure is formed via an innovative laser etching process developed by Applicant.

Figure 2:
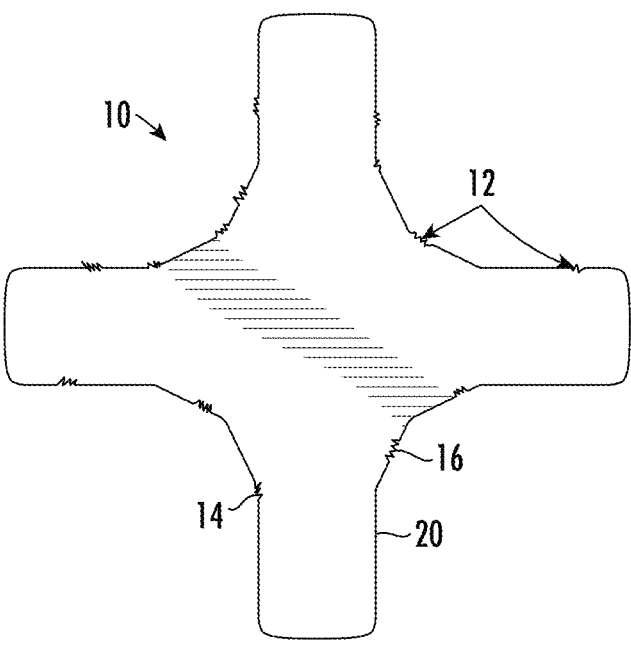
FIG. 2 is a cross-sectional top view of a laser-etched screwdriver tip, according to an exemplary embodiment.

Referring to FIG. 2, a cross section of Philips screwdriver tip 10 that includes multiple etching channel groupings 12 is shown. Each etching channel grouping 12 includes a plurality of parallel channels, grooves, or depressions 14. The formation of the channels 14 within a given channel grouping 12 generates serrated teeth 16. Though a Philips screwdriver tip is shown in this embodiment, in other embodiments the etching of the present disclosure can be applied to other types of screwdriver tips, such as a flathead screwdriver tip, and including screwdriver bits.

Figure 3:
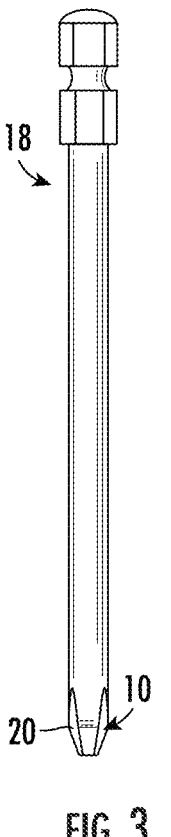
FIG. 3 is a perspective side view of a bit having a laser-etched screwdriver tip, according to an exemplary embodiment.
Figure 4:
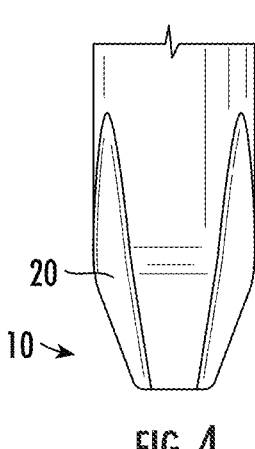
FIG. 4 is an enlarged perspective side view of the laser-etched screwdriver tip shown in FIG. 1.
Figure 5:
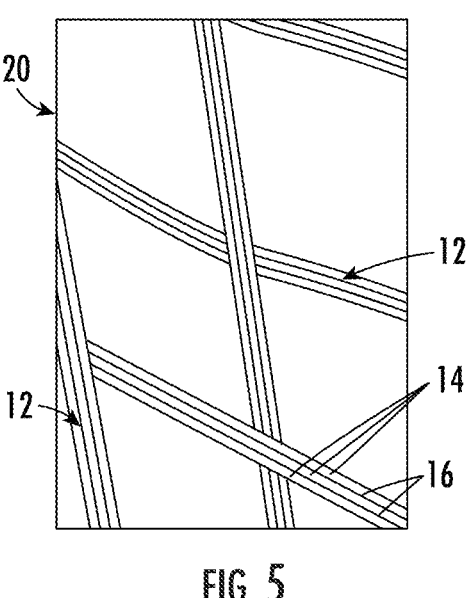
FIG. 5 is an enlarged view of a crosshatch laser-etching pattern, according to an exemplary embodiment.
Figure 6:
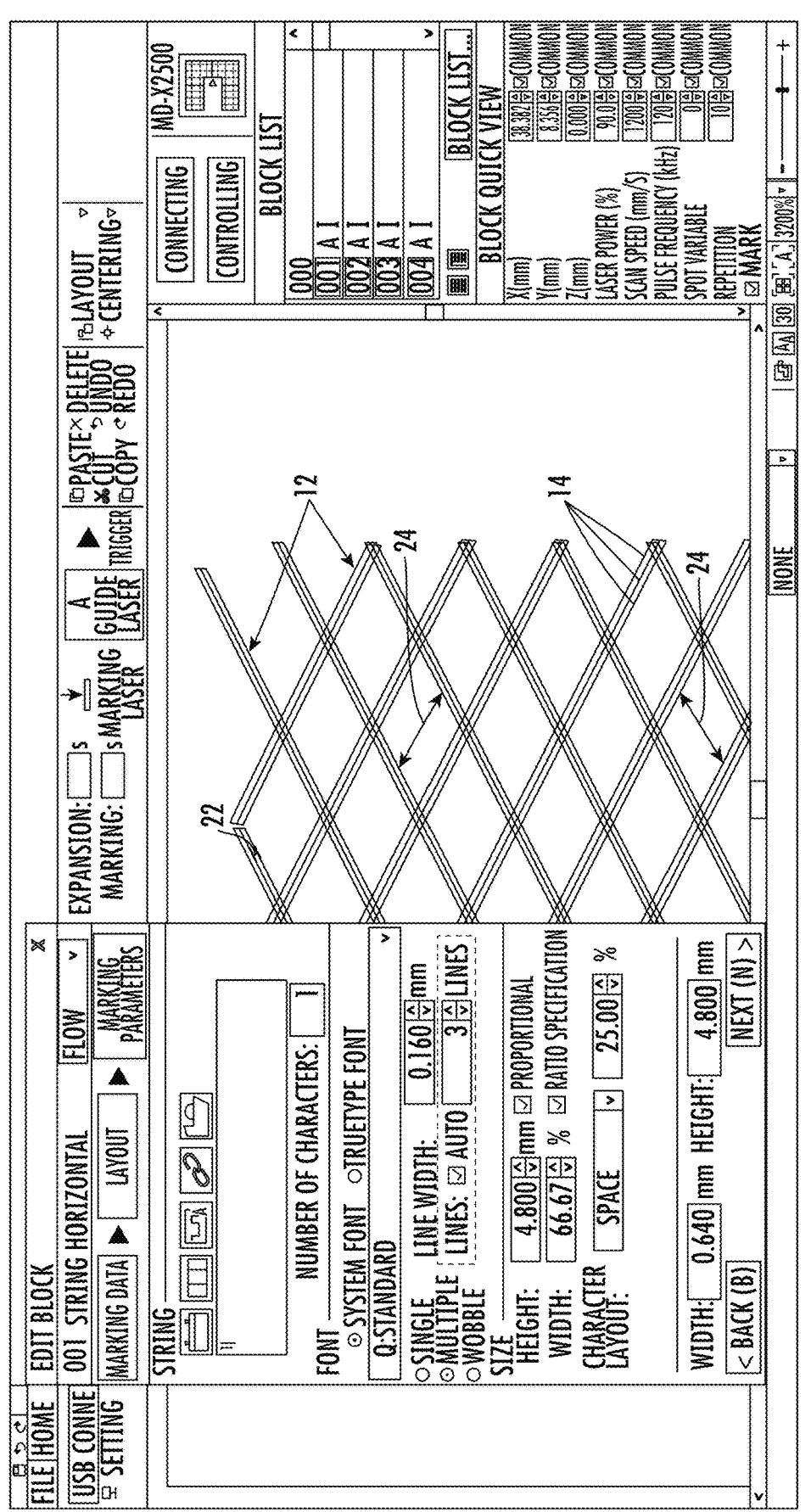
FIG. 6 is a digital rendering of a crosshatch laser-etching pattern, according to an exemplary embodiment.
Figure 7:
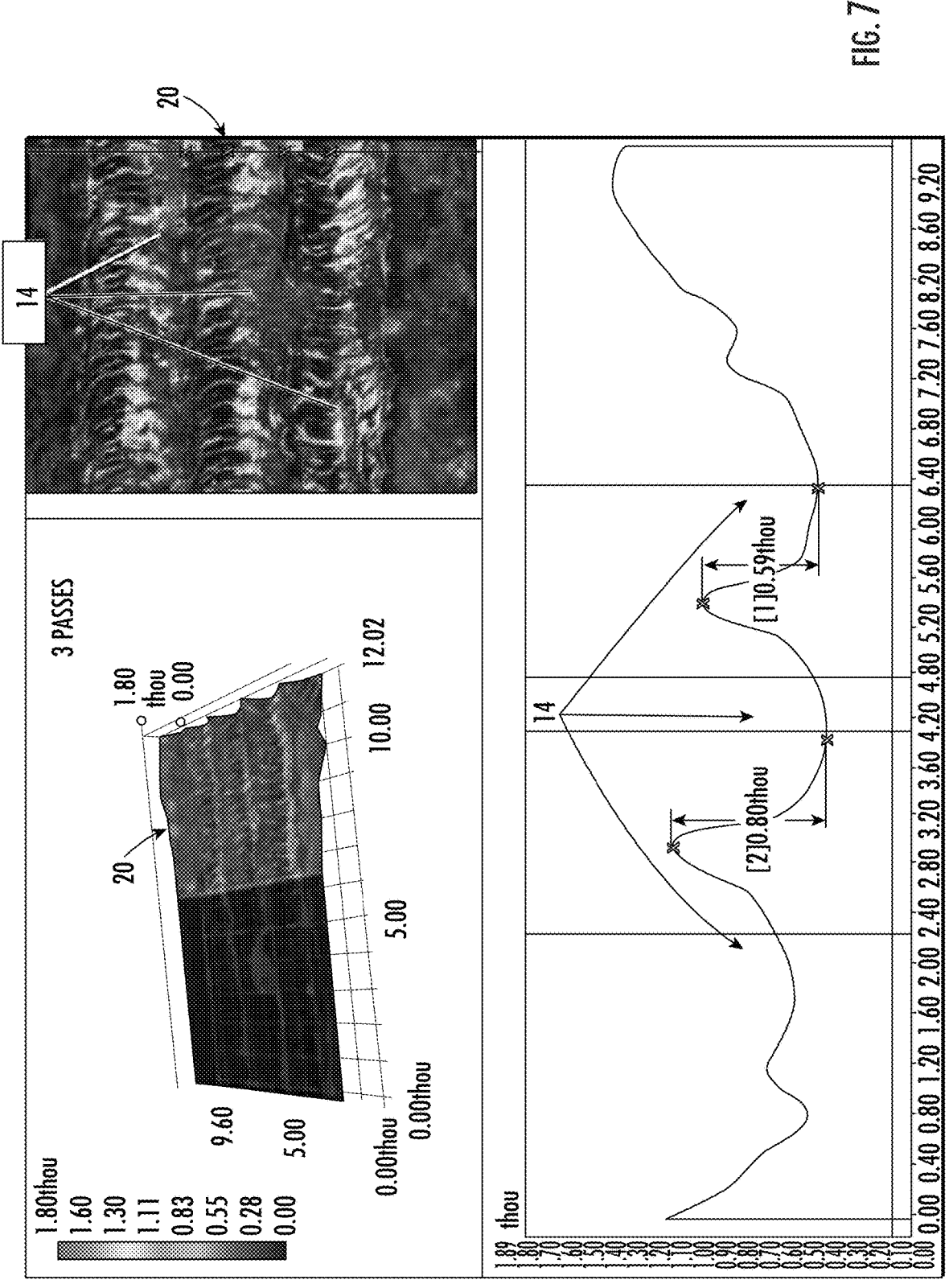
FIG. 7 is a digital surface rendering of a screwdriver tip surface bearing a laser etching pattern, according to an embodiment, in which the etching channels are formed by 3 passes of a laser, along with an accompanying reading mapping the depths of each etching channel.
Figure 8:
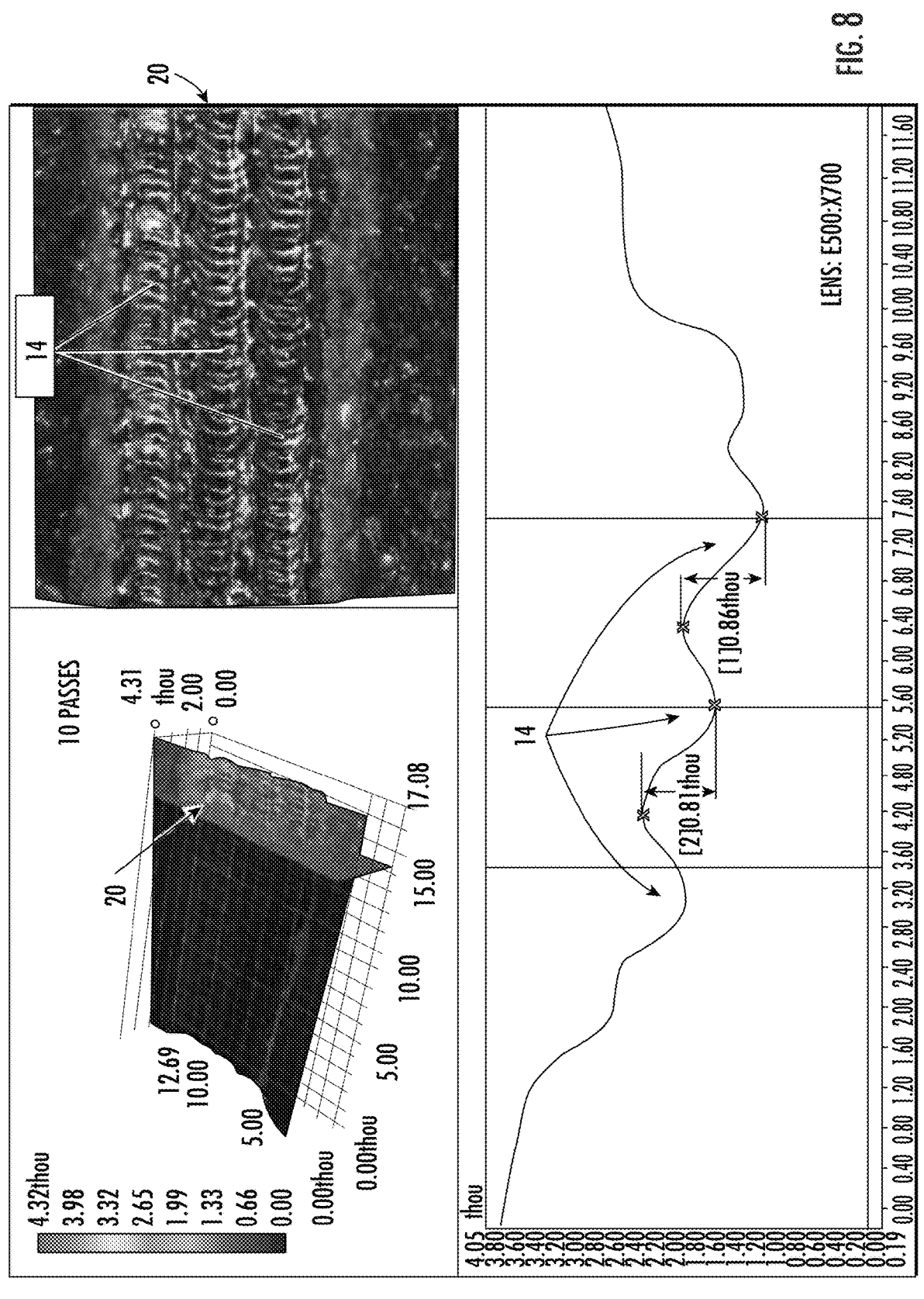
FIG. 8 is a digital surface rendering of a screwdriver tip surface bearing a laser etching pattern, according to an embodiment, in which the etching channels are formed by 10 passes of a laser, along with an accompanying reading mapping the depths of each channel.
Figure 9:
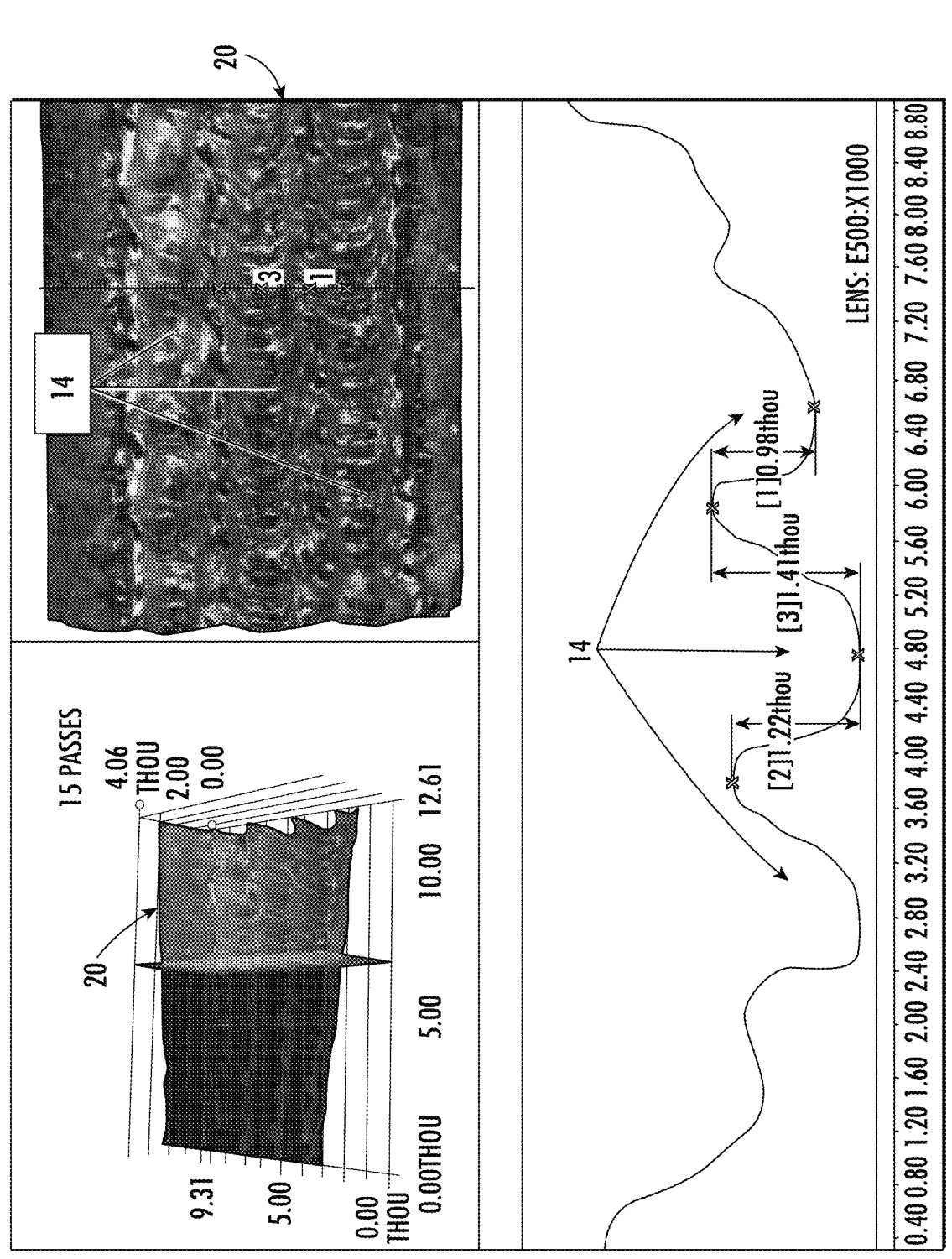
FIG. 9 is a digital surface rendering of a screwdriver tip surface bearing a laser etching pattern, according to an embodiment, in which the etching channels are formed by 15 passes of a laser, along with an accompanying reading mapping the depths of each etching channel.
Figure 10:
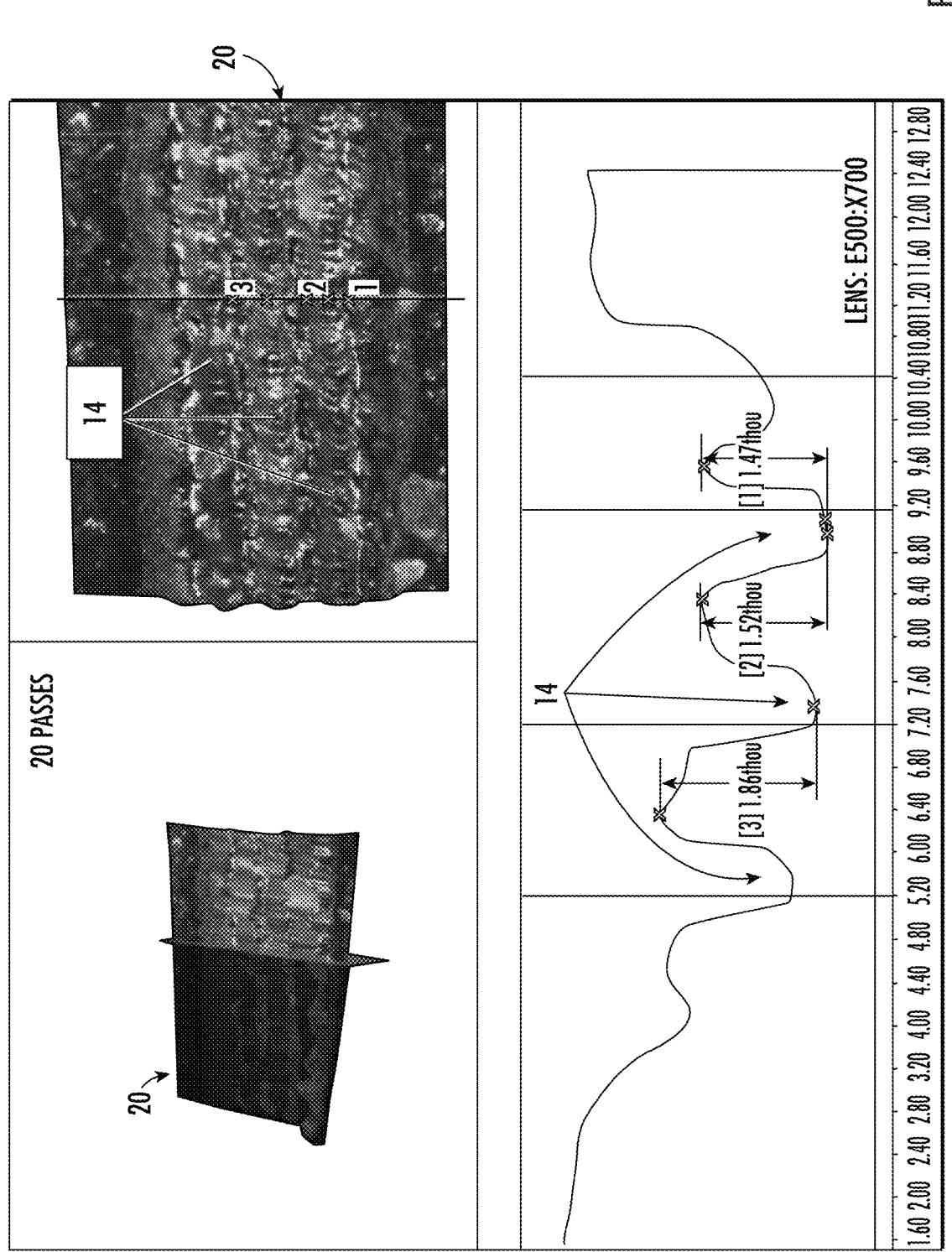
FIG. 10 is a digital surface rendering of a screwdriver tip surface bearing a laser etching pattern, according to an embodiment, in which the etching are channels formed by 20 passes of a laser, along with an accompanying reading mapping the depths of each channel.
Figure 11:
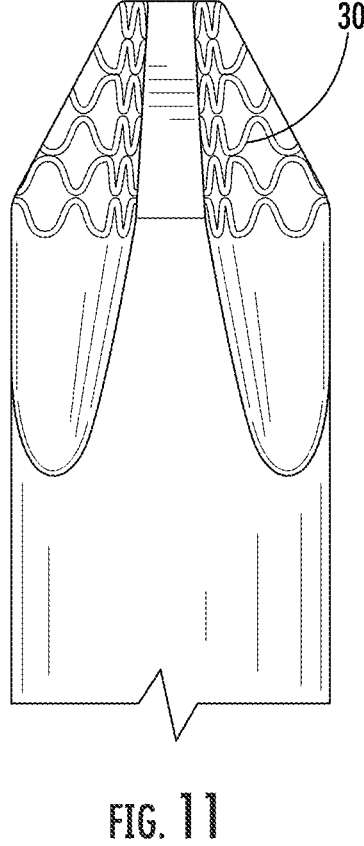
FIG. 11 is an enlarged perspective view of an etching pattern applied to a screwdriver tip surface, according to an exemplary embodiment.
Figure 12:
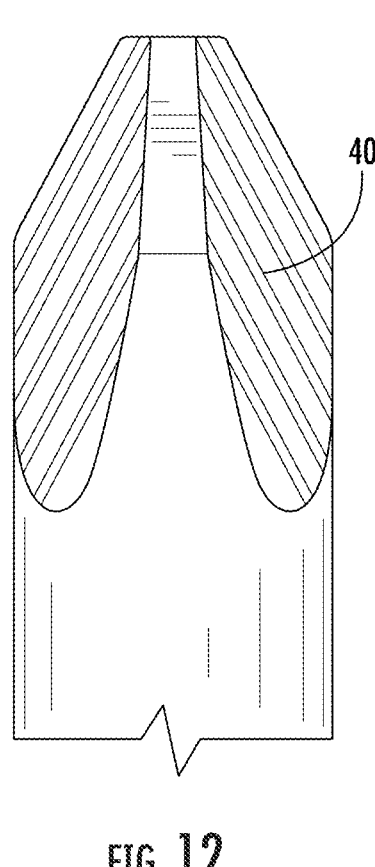
FIG. 12 is an enlarged perspective view of an etching pattern applied to a screwdriver tip surface, according to an exemplary embodiment.
Figure 13:
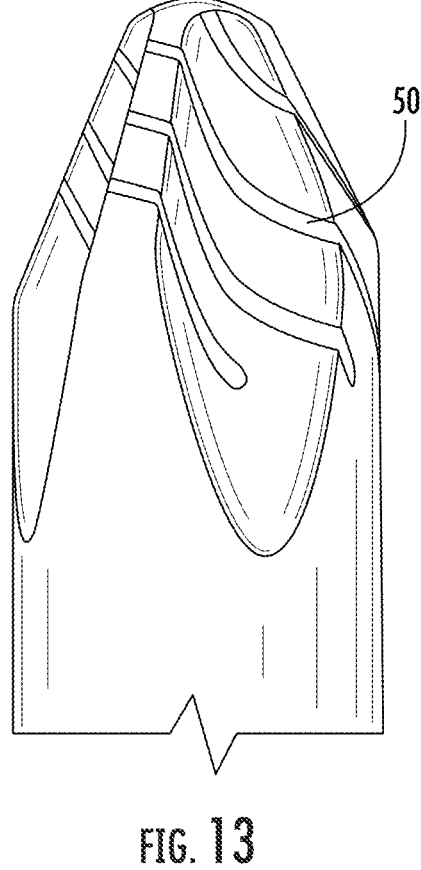
FIG. 13 is an enlarged perspective view of an etching pattern applied to a screwdriver tip surface, according to an exemplary embodiment.
Figure 14:
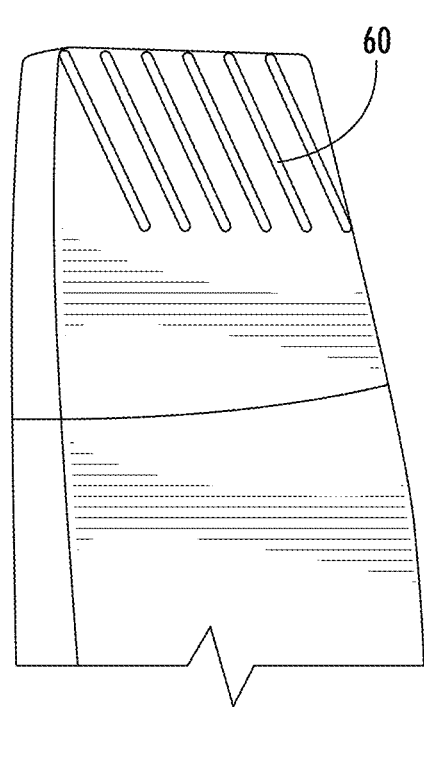
FIG. 14 is an enlarged perspective view of an etching pattern applied to a screwdriver tip surface, according to an exemplary embodiment.
Figure 15:
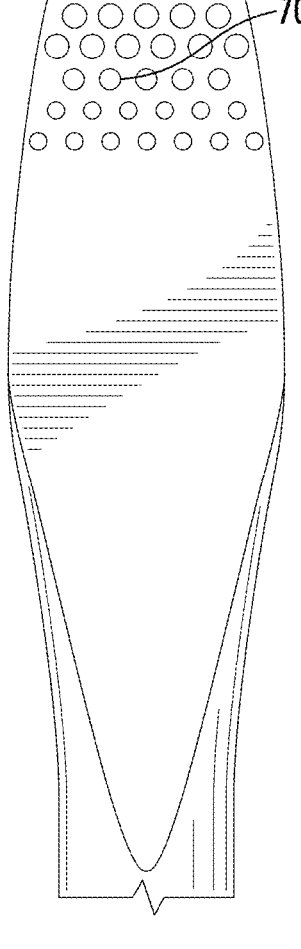
FIG. 15 is an enlarged perspective view of an etching pattern applied to a screwdriver tip surface, according to an exemplary embodiment.
Figure 16:
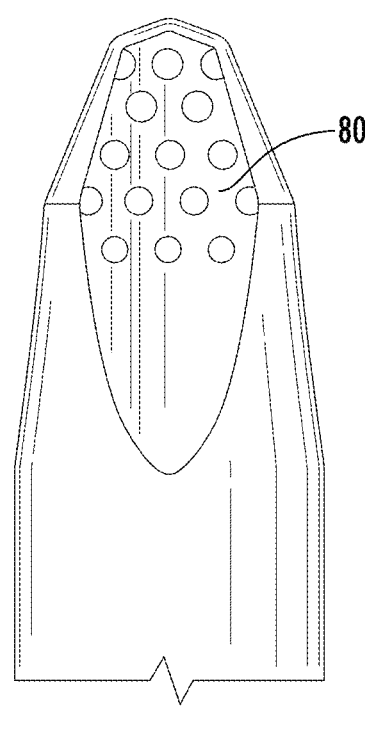
FIG. 16 is an enlarged perspective view of an etching pattern applied to a screwdriver tip surface, according to an exemplary embodiment.

FIGS. 3-4 show a perspective view of a bit 18 having a screwdriver tip 10 with a screwdriver tip surface 20 that is laser-etched with a low-power, crosshatch pattern according to an embodiment of the present disclosure. Though a low-power laser is used to form the etching channels in the embodiments shown here, the power of the laser may be varied to the extent that the channel groupings 12 can still be formed as described herein without introducing significant melted zones between the narrow channels 14. As seen here, the details in this patterning can, in some embodiments, be difficult to discern with the naked eye. Thus, FIG. 5 illustrates a closeup image of a screwdriver tip surface 20 etched with the crosshatch pattern according to the embodiments shown, and FIG. 6 illustrates a digital schematic layout of the crosshatch pattern of the embodiments shown. In FIG. 5, channels 14 are shown etched into screwdriver tip surface 20, forming serrated teeth 16. Each grouping 12 shown in FIGS. 5-6 includes three channels 14. In other embodiments, the groupings may include a different number of channels, such as 2, 4, or 5 channels. In this embodiment, the channels 14 of a given grouping 12 are formed parallel to one another and spaced apart from one another by a channel spacing distance 22. In the current embodiment the channel spacing distance between respective approximate channel centerlines is 1 to 4 thousandths of an inch.

In a given crosshatch direction, the groupings 12 are oriented parallel to one another and spaced apart from one another by a grouping spacing distance 24 that is greater than the channel spacing distance 22. No channels are formed oriented parallel to the channels 14 of the parallel groupings 12 in the section of surface between the parallel groupings 12 that defines the grouping spacing distance 24.

Still referring to FIGS. 5-6, Applicant has developed a laser-etching process for forming a laser-etched workpiece engaging surface, such as surface 20 of tip 10. In general, a laser is passed multiple times over a designated location of surface 20 to form a channel. In specific embodiments, the laser is a low-power laser. Each pass of the laser increases the depth of the channel. Pluralities of channels are formed in this way to form the groupings 12 described above.

To form channel grouping 12, a first plurality of channels 14 is formed. First, the laser is passed over a first location of surface 20 for a first number of passes to form a first channel of the plurality of channels 14. The laser is then passed over a second location of surface 20 for a second number of passes to form a second channel of the plurality of channels 14. In specific embodiments, the second channel is parallel to the first channel and is spaced apart from the first channel by channel spacing distance 22. In specific embodiments, making the first number of laser passes over the first location and making the second number of laser passes over the second location forms a serrated tooth between the first and second channels 14.

In the embodiment shown, each grouping 12 includes three channels 14. In other specific embodiments, each grouping 12 includes a different number of channels, such as 2, 4, or 5 channels. To include a third channel in the grouping 12, the laser is passed over a third location for a third number of passes to form a third channel of the plurality of channels 14. In specific embodiments, the third channel is parallel to the second channel and is spaced apart from the second channel by channel spacing distance 22. After the first channel grouping 12 of channels 14 is formed, a second channel grouping 12 is then formed in the same manner described above. The second plurality of channels 14 that form the second channel grouping 12 are spaced apart from the first plurality of channels 14 that form the first channel grouping 12 by the grouping spacing distance 24. As described in greater detail above, grouping spacing distance 24 is greater than the channel spacing distance 22. In specific embodiments, making the second number of laser passes over the second location and making the third number of laser passes over the third location forms a serrated tooth between the second and third channels 14.

To form the crosshatch pattern shown in FIGS. 5-6, third and fourth channel groupings 12 are formed in the manner described above. The third and fourth pluralities of channels of the respective third and fourth channel groupings 12 are angled with respect to the first and second pluralities of channels 14 of the respective first and second channel groupings 12 to create the crosshatch pattern. Additional channel groupings 12 may be formed in each crosshatch direction until a desired portion of surface 20 is covered with the crosshatch pattern.

In a specific embodiment, the first number of passes is ten, the second number of passes is ten, and the third number of passes is ten. In other specific embodiments, the first number of passes, second number of passes, and third number of passes differ within a specific channel grouping 12. In further specific embodiments, the first number of passes in one channel grouping 12 is different from the first number of passes in a different channel grouping 12. In embodiments in which fewer than or more than three channels 14 are formed within a given grouping 12, the number of locations over which the laser is passed varies according to the number of channels 14.

In certain specific embodiments, various patterns may be used to form the channels 14 within a given channel grouping 12. For example, the low-power laser could be passed once over the first location, once over the second location, once over the third location, then twice over the first location, twice over the second location, twice over the third location, and onward in repetition of this pattern until the first number of passes, second number of passes, and third number of passes are respectively achieved. Alternatively, three parallel low-power lasers could be applied coincidingly over the first, second, and third locations for a predetermined number of passes.

FIGS. 7-10 show digital surface renderings of a grouping 12 of channels 14 formed in the screwdriver tip surface 20 and graphs displaying the depths of the respective channels 14 after 3 passes (FIG. 7), 10 passes (FIG. 8), 15 passes (FIGS. 9) and 20 passes (FIG. 10) of a low-power laser to form each of the channels 14 shown. As illustrated in FIGS. 7-10, each pass of the laser increases the depth of a given channel 14. To form the etching pattern of the embodiment shown, a low-power laser is passed over a given location a number of times sufficient to create channels 14 having respective depths sufficient to generate the serrated teeth 16 within a channel grouping 12.

Experimentation based the crosshatch pattern of the embodiments shown has found channels formed by 10 laser passes to generate an average channel depth of 0.00085 inches and an average camout torque of 197.2 in-lbf and channels formed by 20 laser passes to generate an average depth of 0.0016 inches and an average camout torque of 189.2 in-lbf. Both of these average camout torque values exceed the average camout torque of 152.1 in-lbf generated from testing a screwdriver tip with no etching and the average camout torque of 131.3 in-lbf generated from testing a screwdriver tip with etching channels formed by a single pass of a high-power laser. With respect to average perfor- mance, no difference was shown between the 10-pass cross hatch etching pattern and the 20-pass cross hatch etching pattern. In other embodiments, a different number of passes could be used to form the channels 14 that is less than or greater than 10, though a range of 10-20 passes has shown peak performance.

Referring to FIGS. 11-16, various etching patterns are shown applied to a variety of screwdriver tip surfaces 20-80. Though the intricacies of the individual channels and ser- rations may not be visible to the naked human eye, in some embodiments, as shown here, channel groupings may be etched over a broad enough portion of a screwdriver tip surface that visible patterns begin to emerge in the form of angled or arced lines, zigzags, waves (see FIGS. 11-14), or geometric shapes (see FIGS. 15-16).

Figure 17:
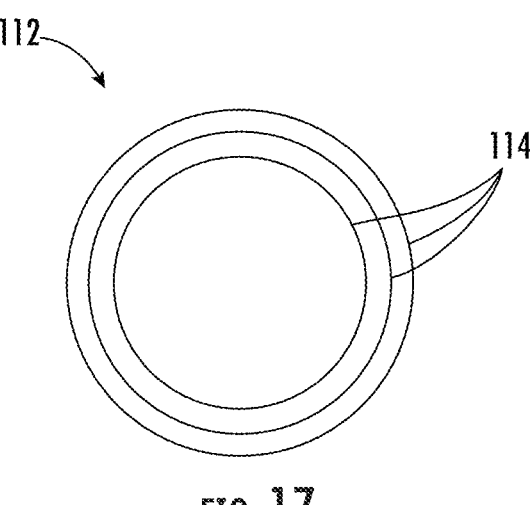
FIG. 17 is a schematic enlarged perspective view of a grouping of etching channels, according to an exemplary embodiment.
Figure 18:
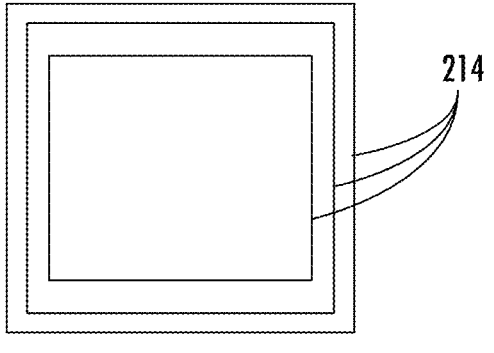
FIG. 18 is a schematic enlarged perspective view of a grouping of etching channels, according to an exemplary embodiment.
Figure 19:
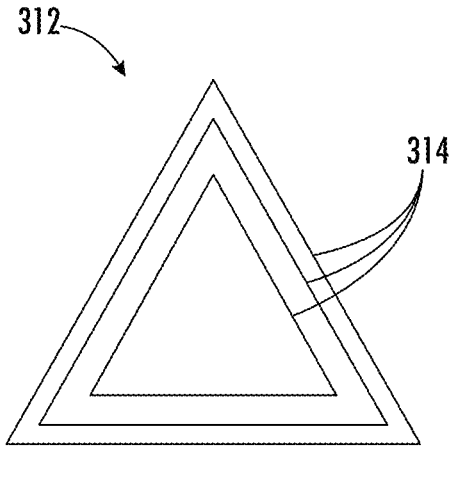
FIG. 19 is a schematic enlarged perspective view of a grouping of etching channels, according to an exemplary embodiment.

In addition, FIGS. 17-19 show schematic views of alter- nate shapes that the channel groupings may form. For instance, the channel grouping 112, shown in FIG. 17, is formed by a series of closely spaced channels 114 arranged in concentric circles. Such a grouping 112 may form a portion of an etching patters, such as that shown in FIG. 15 or FIG. 16. Additionally, channel grouping 212, shown in FIG. 18, is formed by a series of closely spaced channels 214 arranged in concentric squares. And further, channel group- ing 312, shown in FIG. 19, is formed by a series of closely spaced channels 314 arranged in concentric triangles. In various embodiments, screwdriver 6 may include any one or the etching patterns shown in FIGS. 11-19, or a combination thereof. Further, though the above-described etching pat- terns are shown in these embodiments as applied to the tips of various screwdrivers, the same etching patterns could be formed into the tips of tools such as pry bars, nail pullers, wrenches, hammers, pliers, keys, or other fastening tools.

It should be understood that the figures illustrate the exemplary embodiments in detail, and it should be under- stood that the present application is not limited to the details or methodology set forth in the description or illustrated in the figures. It should also be understood that the terminology is for description purposes only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exem- plary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exem- plary embodiments without departing from the scope of the present invention. In addition, as used herein, the article "a" is intended to include one or more component or element and is not intended to be construed as meaning only one.

Various embodiments of the invention relate to any com- bination of any of the features, and any such combination of features may be claimed in this or future applications. Any of the features, elements, or components of any of the exemplary embodiments discussed above may be utilized alone or in combination with any of the features, elements or components of any of the other embodiments discussed above.

What is claimed is:

1. A tool comprising:
   a handle;
   a shaft extending from the handle;
   a laser-etched workpiece engaging surface on the shaft, the laser-etched workpiece engaging surface com- prising:
      a first plurality of parallel channels spaced apart from one another by a first spacing distance; and
      a second plurality of parallel channels spaced apart from one another by the first spacing distance and oriented parallel to the first plurality of parallel channels; and
   a first surface section located between the first plurality of parallel channels and the second plurality of parallel channels, the first surface section defining a second spacing distance between the first plurality of parallel channels and the second plurality of parallel channels measured orthogonal to the first plurality of parallel channels and the second plurality of parallel channels;
   wherein the first surface section does not include a channel oriented parallel to the first plurality of parallel channels and the second plurality of parallel channels; and
   wherein the second spacing distance is greater than the first spacing distance.

2. The tool of claim 1, wherein the first plurality of parallel channels comprises a first channel and a second channel, and further comprising a first serrated tooth formed between the first channel and the second channel.

3. The tool of claim 2, wherein the first plurality of parallel channels further comprises a third channel, and further comprising a second serrated tooth formed between the second channel and the third channel.

4. The tool of claim 2, wherein a depth of the first channel is between approximately 0.00085 inches and approximately 0.0016 inches.

5. The tool of claim 1, wherein the first spacing distance is between 1 and 4 thousandths of an inch.

6. The tool of claim 1, wherein the first plurality of parallel channels comprises the same number of channels as the second plurality of parallel channels.

7. The tool of claim 1, further comprising a third plurality of parallel channels spaced apart from one another by the first spacing distance, and a fourth plurality of parallel channels spaced apart from one another by the first spacing distance and oriented parallel to the third plurality of parallel channels, wherein the fourth plurality of parallel channels is spaced apart from the third plurality of parallel channels by the second spacing distance, and wherein the third plurality of parallel channels and the fourth plurality of parallel channels are positioned at an angle with respect to the first plurality of parallel channels and the second plurality of parallel channels, such that a crosshatch pattern is defined on the laser-etched workpiece engaging surface.

8. A tool comprising:

a handle;

a shaft extending from the handle;

a laser-etched workpiece engaging surface located on the shaft, the laser-etched workpiece engaging surface comprising:

a first channel grouping comprising a plurality of first channels, wherein each of the first channels are spaced apart from one another by a first spacing distance of between 1 thousandth of an inch and 4 thousandths of an inch, and a second channel grouping comprising a plurality of second channels, wherein each of the second channels are spaced apart from one another by the first spacing distance;

wherein the second channel grouping is spaced apart from the first channel grouping by a non-etched surface section having a second spacing distance, the second spacing distance measured orthogonal to the first channel grouping and the second channel grouping, wherein the second spacing distance is greater than the first spacing distance; and wherein the first channel and the second channel each define a depth between approximately 0.00085 inches and approximately 0.0016 inches.

9. The tool of claim 8, wherein the first channel grouping and the second channel grouping form a pattern of one of waves, zigzags, arced lines, angled lines, or geometric shapes.

10. The tool of claim 9, wherein the pattern of geometric shapes comprises a plurality of one of concentric circles, concentric polygons, or concentric triangles.

11. The tool of claim 8, wherein the laser-etched workpiece engaging surface is formed on a tip configured for engaging a screw head.

12. The tool of claim 11, wherein the tip is one of a flathead tip or a Philips tip.

13. The tool of claim 8, further comprising a third channel grouping comprising a plurality of third channels spaced apart from one another by the first spacing distance, and a fourth channel grouping comprising a plurality of fourth channels spaced apart from one another by the first spacing distance, wherein the fourth channel grouping is spaced apart from the third channel grouping by the second spacing distance, and wherein the first channel grouping, the second channel grouping, the third channel grouping, and the fourth channel grouping form a crosshatch pattern.

* * * * *